United States Patent
Sobelman et al.

(10) Patent No.: US 7,697,563 B2
(45) Date of Patent: Apr. 13, 2010

(54) SWITCHING DEVICE OF NETWORKS-ON-CHIP SYSTEM AND SCHEDULING METHOD THEREOF

(75) Inventors: Gerald E. Sobelman, Minneapolis, MN (US); Man-ho Kim, Seoul (KR); Daewook Kim, Seoul (KR); Sang-woo Rhim, Seoul (KR); Eui-seok Kim, Suwon-si (KR); Beom-hak Lee, Seoul (KR)

(73) Assignees: Samsung Electronics Co., Ltd, Suwon-Si (KR); Regents of the University of Minnesota, Minneapolis, MN (US)

( * ) Notice: Subject to any disclaimer, the term of this patent is extended or adjusted under 35 U.S.C. 154(b) by 960 days.

(21) Appl. No.: 11/326,327

(22) Filed: Jan. 6, 2006

(65) Prior Publication Data

US 2006/0187953 A1 Aug. 24, 2006

(30) Foreign Application Priority Data

Jan. 7, 2005 (KR) ...................... 10-2005-0001826

(51) Int. Cl.
*H04J 3/02* (2006.01)
(52) U.S. Cl. .................................... 370/462; 370/395.4
(58) Field of Classification Search ................. 370/462, 370/395.4, 395.1, 389, 392, 235, 401, 426, 370/464, 465, 468, 320, 321
See application file for complete search history.

(56) References Cited

U.S. PATENT DOCUMENTS 5,796,869 A * 8/1998 Tsuji et al. .................. 382/203
6,272,132 B1 * 8/2001 Ofek et al. ................... 370/389
6,324,159 B1 * 11/2001 Mennekens et al. ......... 370/203
2004/0066791 A1 * 4/2004 Wu et al. ..................... 370/419
2006/0067218 A1 * 3/2006 Clermidy et al. ............ 370/230
2006/0203843 A1 * 9/2006 Liu ............................. 370/465
2007/0263665 A1 * 11/2007 Dapper et al. ............... 370/480

FOREIGN PATENT DOCUMENTS

| EP | 1 162 861 | 12/2001 |
| JP | 2002-51079 | 2/2002 |
| JP | 2004-23305 | 1/2004 |

OTHER PUBLICATIONS

Kim et al. "CDMA-Based Network-On-Chip Architecture" IEEE Asia-Pacific Conference on Circuits and Systems, 2004. vol. 1, Dec. 6-9, 2004 pp. 137-140.

(Continued)

*Primary Examiner*—Dang T Ton
*Assistant Examiner*—Nourali Mansoury

(57) ABSTRACT

A switching device of NoC (Networks on Chip) system and a scheduling method thereof. The switching device has a switching part having a plurality of input ports and a plurality of output ports, and a scheduler for setting a transmission route between the input ports and the output ports, determining the length of code based on the number of input ports having the data among the plurality of input ports, and assigning a predetermined code of the determined code length to the input port and the output port corresponding to the set transmission route. Because the code length is adjustably varied according to the number of transmission packets, switch performance improves.

12 Claims, 9 Drawing Sheets

OTHER PUBLICATIONS

Korean Office Action issued on Sep. 7, 2006 with respect to Korean Application No. 10-2005-0001826, which corresponds to the above-referenced application.

Office Action mailed on Aug. 5, 2008 and issued in corresponding Japanese Patent Application No. 2006-002859.

* cited by examiner

SWITCHING DEVICE OF NETWORKS-ON-CHIP SYSTEM AND SCHEDULING METHOD THEREOF

CROSS-REFERENCE TO RELATED APPLICATION

This application claims benefit under 35 U.S.C. §119 from Korean Patent Application No. 10-2005-0001826, filed on Jan. 7, 2005, the entire content of which is incorporated herein by reference.

BACKGROUND OF THE INVENTION

1. Field of the Invention

The present invention relates to a switching device of networks-on-chip system, and a scheduling method thereof. More specifically, the present invention relates to a switching device of a networks-on-chip system and a scheduling method thereof, which is capable of variably allocating codes in accordance with the number of ports actually possessing data.

2. Description of the Related Art

Following the convergence of the fields of computers, communications and broadcasting, demands are rapidly changing from the ASIC (Application Specific IC) and ASSP (Application Specific Standard Product) to SoC (System on Chip). In addition to this, compactness and simplification and high functionality of IT (Information Technology) devices also stimulate SoC industry.

SoC is a technology-integrated semiconductor technique which realizes complicated systems of different functions into a single chip. Many studies are conducted for realization of SoC, and above all, a way to connect different ID elements built in the chip to each other, has been considered the most important issue.

A bus-based connection is widely used to connect IP elements. However, as the chip density increases and amount of information flow between IP elements surges, bus-based SoC has almost reached its structural limit.

In an attempt to overcome the above-mentioned problems of the bus-based SoC structure, a NoC (networks-on-chip), which incorporates general network technology in chips to connect IPs, has been newly suggested.

Active studies are being conducted by many laboratories around the world, and currently developing NoC architectures include, according to the type of switching, TDMA (Time Division Multiple Access)-based NoC, and CDMA (Code Division Multiple Access)-based NoC.

CDMA-based NoC uses orthogonality of the codes, and thus is capable of using wide bandwidth and robust to noise. However, a scheduling technology to guarantee switch fairness and prevent starvation of the NoC switch, has yet to be developed.

The CDMA switch also has a problem of occupying wide bandwidth even when there is a relatively few number of IPs to send signals from one point, because the fixed code length is used according to the conventional way.

FIG. 1 shows the structure of a conventional CDMA switch.

In CDMA switch, generally at least two IPs share one common switch. The CDMA switch of FIG. 1 illustrates the example where eight IPs A to H share one single switch.

In order to perform switching of eight IPs A to H in a star structure, it is always required to assign eight bits of different Walsh codes to the respective IPs. The following table 1 shows the Walsh Codes which are differently assigned to each of the IPs A to H.

TABLE 1

| Resource Address | Assigned Code |
|---|---|
| A | 00000000 |
| B | 01010101 |
| C | 00110011 |
| H | 01101001 |

As shown above, different codes are required for each of the ports in order to perform switching of packets at the ports. Accordingly, codes are unnecessarily waste especially when only a few number of IPs intend to transmit and receive data. Additionally, the CDMA switch also requires to longer length of codes as the number of ports increase. Therefore, requirements for computations and power increase in the switch.

Furthermore, in the event of competition in the CDMA switch, there is no specific scheduling method provided to solve such a problem. As mentioned above, the scheduling is very essential for the optimum networking of a single chip such as maintaining fairness of switch and reduction of latency.

However, due to the problems as mentioned above, the CDMA switch, is not widely used despite of its various advantages. As a result, improvement is required.

SUMMARY OF THE INVENTION

Additional aspects and/or advantages of the invention will be set forth in part in the description which follows and, in part, will be apparent from the description, or may be learned by practice of the invention.

Accordingly, it is an embodiment of the present invention, to provide a NoC switching device and a scheduling method thereof provides a capability of variably assigning length of the codes irrespective of the number of available ports, and therefore, which variably assigns the length of the codes in accordance with the number of ports which have the data during the data transmission.

The above aspects and/or other features of the present invention can substantially be achieved by providing a switching device of a NoC (Networks on chip) system, which includes a switching part including a plurality of input ports and a plurality of output ports, and a scheduler for setting a transmission route between the input ports and the output ports, determining the length of code based on the number of input ports having the data among the plurality of input ports, and assigning a predetermined code of the determined code length to the input port and the output port corresponding to the set transmission route.

The scheduler includes a request route setting arbiter for determining a request route through which the input port requests the output port for transmission, and a grant route setting arbiter for determining a grant route through which the output port grants transmission to the input port.

The request route setting arbiter and the grant route setting arbiter may comprise a Round Robin arbiter which has a table of one or more concentric circles of different code lengths, and each of the concentric circles may include a plurality of cells which are assigned with a predetermined codeword.

The number of concentric circles may be determined by:

$$N=2^n$$

where, N is the number of input ports provided to the switching part, and n is the number of concentric circles.

The table of the concentric circles may be assigned with an orthogonal code which increases in length from the center toward the outer boundary of the circles.

The request route setting arbiter and the grant route setting arbiter may assign the codes of (m)th concentric circle from the center according to the following mathematical expression, to the input port and the output port corresponding to the set transmission route:

$$\text{when } \frac{N}{2^3} \leq T \leq \frac{N}{2^2}, m = 1$$

$$\text{when } \frac{N}{2^2} < T \leq \frac{N}{2}, m = 2$$

$$\text{when } \frac{N}{2} < T \leq N, m = 3.$$

where, N is the number of input ports provided to the switching part, and T is the number of input ports possessing the data.

The request route setting arbiter may determine a code of the first cell to meet after rotating a pointer in a predetermined direction, to be a spreading code.

The grant route setting arbiter may determine a code of the first cell to meet after rotating a pointer in a predetermined direction, to be a despreading code.

According to one aspect of the present invention, a scheduling method of a switching device including an input port for receiving data and an output port for outputting the data transmitted from the input port, may be provided, which includes setting a transmission route between the input port and the output port, determining the length of code based on the number of input ports which have data among the plurality of input ports, assigning a predetermined code of the determined code length to the input port and the output port corresponding to the set transmission route, and spreading and dispreading the data by the assigned code.

The operation of setting the transmission route may include determining a request route through which the input port requests transmission the output port, and requesting the transmission according to the determined request route, and determining a grant route through which the output port grants transmission to the input port, and granting the transmission according to the determined grant route.

The predetermined code may include an OVSF (Orthogonal Variable Spreading Factor) code which is variable in length.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
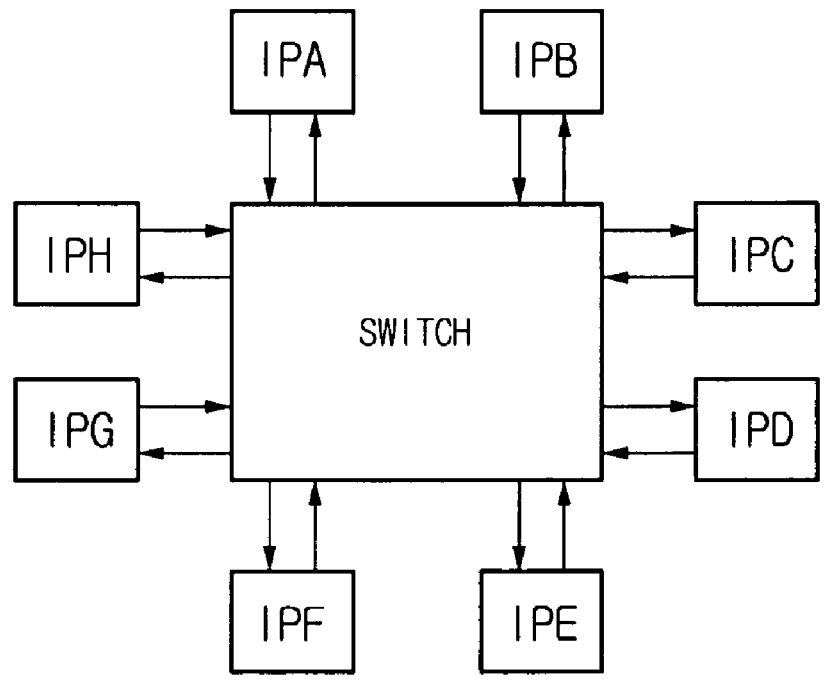
FIG. 1 shows the structure of a conventional CDMA switch.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
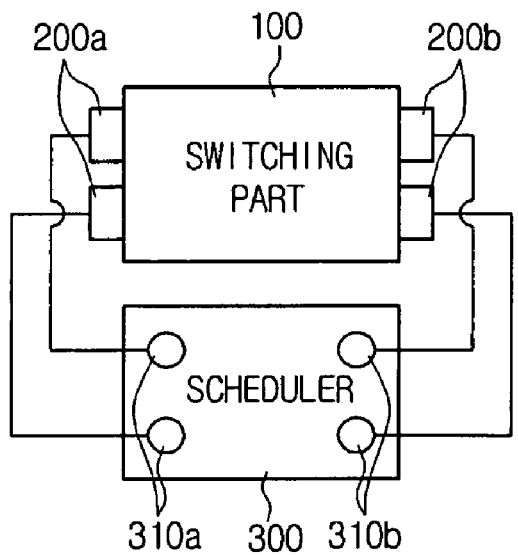
FIG. 2 is a schematic view of a switching device according to an embodiment of the present invention.

FIG. 2 shows the structure of a switching device according to an embodiment of the present invention.

Referring to FIG. 2, a switching device according to an embodiment of the present invention includes a switching part 100 having a plurality of ports 200a and 200b, and a scheduler 300 having a plurality of arbiters 310a and 310b.

The switching part 100 includes a plurality of input ports 200a to receive data from an IP (not shown) and a plurality of output ports 200b to output received data from the input ports 200a to the IP. The switching part 100 also operates to switch data between the input ports 200a and the output ports 200b so that data can be transmitted according to the transmission route as set by a scheduler 300 which will be described below.

One or more input ports 200a request to one or more output ports 200b for data transmission, and the output ports 200b grant the transmission request of the input ports 200a.

The scheduler 300 sets a transmission route between the input ports 200a and the output ports 200b. In order to determine transmission route between the input ports 200a and the output ports 200b, the scheduler 300 includes a plurality of arbiters 310a and 310b corresponding to each of the input ports 200a and the output ports 200b.

It is not necessary to set a separate route if one input port 200a requests one output port 200b for transmission and one transmission request is input to the output port 200b. However, if one input port 200a requests transmission to a plurality of output ports 200b, or, if one output port 200b receives a plurality of transmission requests, the route for request and grant should be set. In this particular embodiment, the arbiters 310a and 311b are applied for this purpose. The arbiters 310a and 310b will be explained detail below with reference to FIG. 3.

The scheduler 300 determines the code length to assign to the input port 200a and the output port 200b based on the number of active input ports 200a which actually posses the data among the plurality of input ports 200a. When the code length is determined, the determined code length is assigned to the input port 200a and the output port 200b which correspond to the predetermined transmission route.

The scheduler 300 assigns a code to the input port 200a and the output port 200b, and then, determines whether contention occurs by applying an XOR calculation to active ones of the input port 200a. If a value of '1' does not exist in the result of XOR calculation, the scheduler 300 determines that contention occurs among the active input ports.

If at least one value of '1' exists in the result of XOR calculation, it is determined that no contention occurs. For example, if 0011 XOR 0101=0110, there exist two values of '1'.

If there is not value is no value of '1' in the result of XOR calculation, it is determined that one or two contentions occur. For example, if 0101 XOR 0101=0000, if 0011 XOR 0011=0000, and of 0101 XOR 0101=0000, there is no value of '1' in the result of XOR calculation.

If it is determined that contention occurs among the active input ports as the XOR calculation result, the scheduler 300 changes locations of the active input ports such that all the active input ports are located adjacent to one another in a concentric table. For example, if four of eight input ports are in active and if three of them are located adjacent to one another in the circular table but one is distanced from the other three input ports, possible contention is prevented by the above-mentioned process.

Preferably, the code assigned to the input port 200a and the output port 200b by the scheduler 300 may be OVSF (Orthogonal Variable Spreading Factor) code. The OVSF code varies length of orthogonal code, which is illustrated as below:

TABLE 2

| No. | 2S | 4S | 8S |
|---|---|---|---|
| 1 | 00 | 0000 | 00000000 |
| 2 | 01 | 0101 | 01010101 |
| 3 | 00 | 0011 | 00110011 |
| 4 | 01 | 0110 | 01100110 |
| 5 | 00 | 0000 | 00001111 |
| 6 | 01 | 0101 | 01011010 |
| 7 | 00 | 0011 | 00111100 |
| 8 | 01 | 0110 | 01101001 |

Referring to Table 2, when there is not more than two input ports 200a which posses the data, the scheduler 300 assigns 2S code to the input port 200a and the output port 200b corresponding to the transmission route, while when there is three or four input orts 200a possessing the data, the scheduler 300 assigns 4S code to the input port 200a and the output port 200b corresponding to the transmission route. When there are five to eight input ports 200a having the data, the scheduler 300 assigns 8S code to the input port 200a and the output port 200b corresponding to the transmission route. As mentioned above, the scheduler 300 variably assigns code in accordance with the number of input ports 200a possessing the data.

Figure 3:
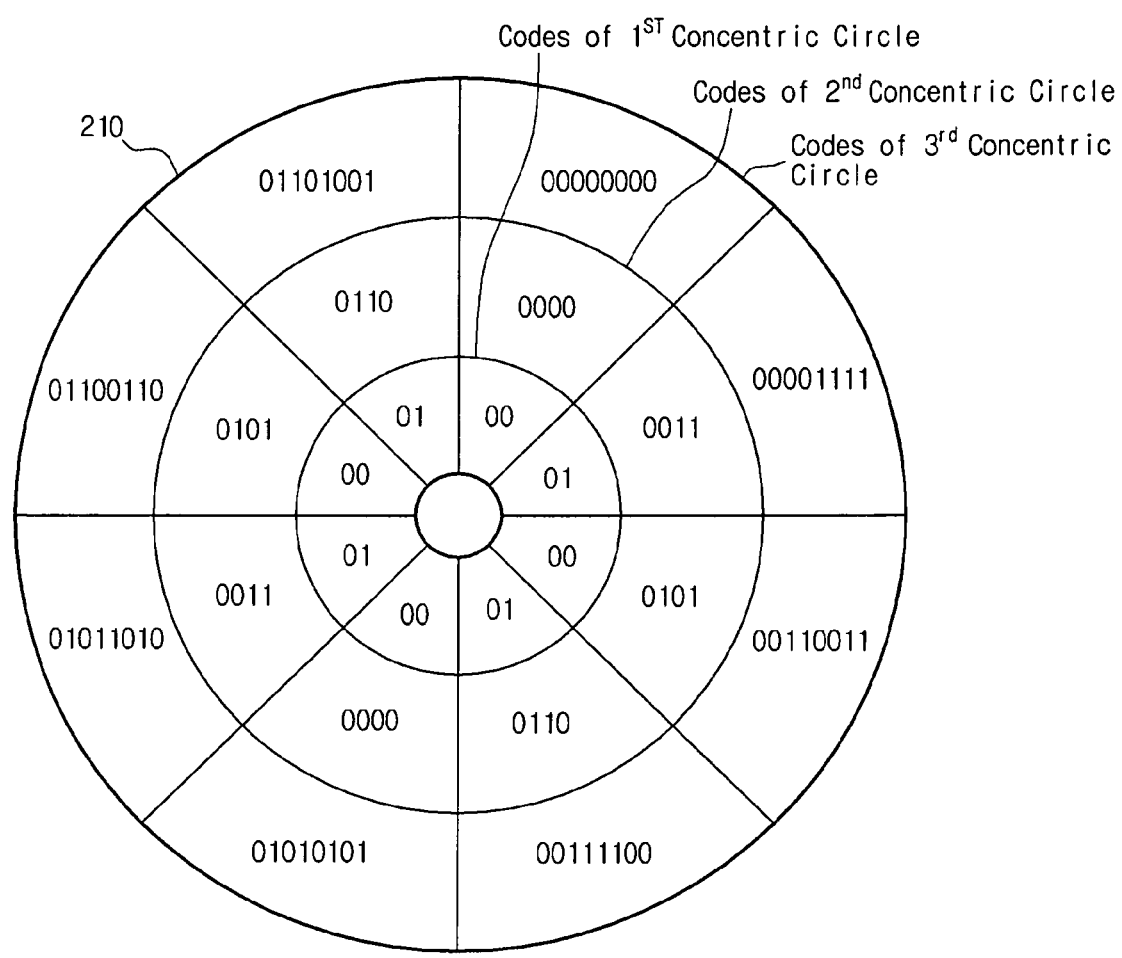
FIG. 3 shows an arbiter according to an embodiment of the present invention.

FIG. 3 shows an arbiter according to an embodiment of the present invention.

Referring to FIG. 3, the arbiters 310a and 310b (see FIG. 2) adopt Round Robin method, and in this particular embodiment, the arbiters 310a and 310b are formed into a concentrically-circular table.

The concentrically circular table of the arbiters 310a and 310b is divided into a predetermined number of cells to correspond to the number of input ports 200a, and OVSF codes as listed in Table 2 are assigned so that the length increases from the center toward the outer boundary. The OVSF code assigned to the arbiters 310a and 310b correspond to the port name of the input port 200a and the output port 200b.

Although not shown in FIG. 3, the arbiters 310a and 310b of Round Robin method uses a Round-Robin pointer to select one among the plurality of transmission requests or to select one among the plurality of transmission grants.

The arbiter connected with the input port 200a rotates from the current point in a predetermined direction and determines the first one that it meets among the plurality of output ports 200b, to be the output port 200b to which the input port 200a will request the transmission. The arbiter 310a connected with the input port 200a will be called a 'request route setting arbiter' 310a.

The arbiter connected with the output port 200b rotates from the current point in a predetermined direction and determines the input port corresponding to the first port name that it meets among the plurality of input ports 200a, to be the input port to grant the transmission. The arbiter connected with the output port 200b will be called 'grant route setting arbiter' 310b.

According to a particular embodiment of the present invention, the request route setting arbiter 310a and the grant route setting arbiter 310b are provided to correspond to the plurality of input ports 200a and the plurality of output ports 200b one to one, and the plurality of arbiters 210 operate independently.

The number of concentric circles of the request route setting arbiter 310a and the grant route setting arbiter 310b may be determined in accordance with the number of input ports 200a provided to the switching part 100, which can be expressed as:

$$N = 2^n \qquad \text{[Expression 1]}$$

where, N is the number of input ports 200a available to the switching part 100, and n is the number of concentric circles.

FIG. 3 shows one example where there are three concentric circles for the request route setting arbiter 310a and the grant route setting arbiter 310b according to the expression 1 and based on the assumption that there are eight input ports 200a available to one switching part 100. Accordingly, it will now be assumed in the following description that there are three concentric circles for the request route setting arbiter 310a and the grant route setting arbiter 310b according to the expression 1.

According to the following expression 2, the request route setting arbiter 310a and the grant route setting arbiter 310b assign the codes of (m)th concentric circle from the center to the input port 200a and the output port 200b which correspond to the transmission route. More specifically, codes assigned to the input port 200a are used as the spreading codes, while codes assigned to the output port 200b are used as the dispreading codes.

$$\text{when } \frac{N}{2^3} \le T \le \frac{N}{2^2}, m = 1 \qquad \text{[Expression 2]}$$
$$\text{when } \frac{N}{2^2} < T \le \frac{N}{2}, m = 2$$
$$\text{when } \frac{N}{2} < T \le N, m = 3.$$

where, N is the number of input ports 200a provided to the switching part 100, and T is the number of input ports 200a possessing the data.

That is, when there is not more than two input ports 200a which posses the data, the code of the first circle from the center is applied, when there are three or four input ports 200s which posses the data, the code of the second circle from the center is applied, and when there are five to eight input ports 200a which posses the data, the code of the third circle from the center is applied.

Figure 4A:
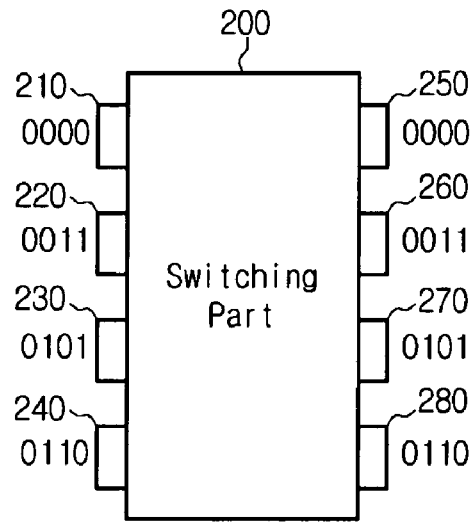
FIGS. 4A to 4C are provided for explaining the operation of a switching device according to an embodiment of the present invention.
Figure 4B:
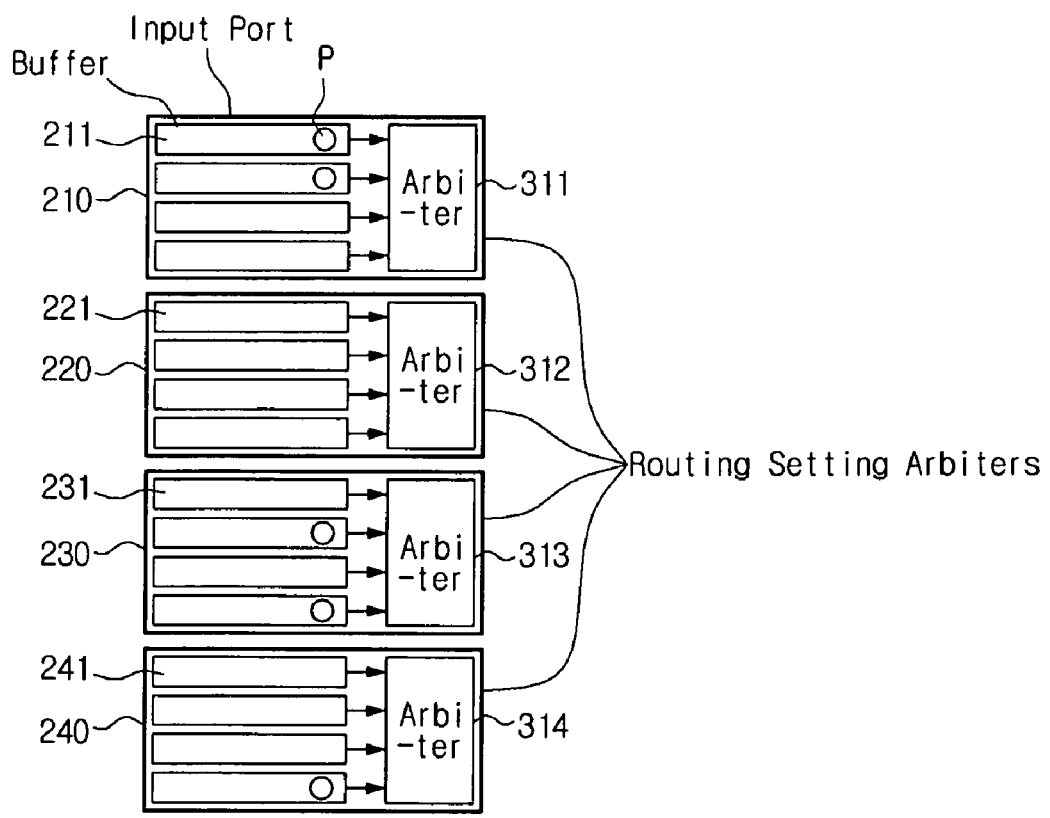
Figure 4C:
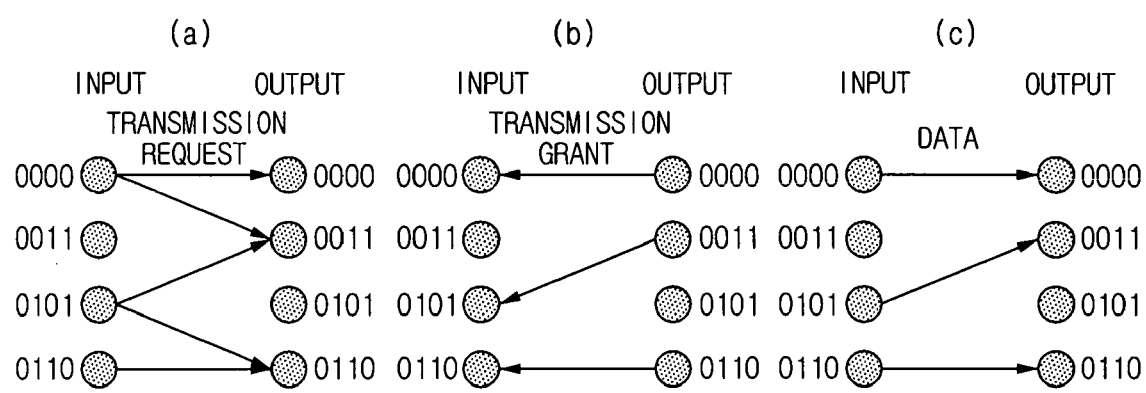

FIGS. 4A to 4C are view provided for explanation of the operation of a switching device according to an embodiment of the present invention.

FIG. 4A shows the input ports 210, 220, 230, 240 and the output ports 250, 260, 270, 280 of the switching part 200, FIG. 4B illustrates the structure of the input ports 210, 220, 230, 240, and FIG. 4C illustrate the process of setting transmission route between the input ports 210, 220, 230, 240 and the output ports 250, 260, 270, 280.

Referring to FIG. 4A, the switching part 200 includes four input ports 210, 220, 230, 240 and four output ports 250, 260, 270, 280. Each of the input ports 210, 220, 230, 240 is paired with each of the output ports 250, 260, 270, 280 under a predetermined port name.

Referring to FIG. 4B, the input ports 210, 220, 230, 240 include buffers 211, 221, 231, 241 used as VOQs (Virtual Output Queuing). "0000" input port 210 and "0101" input port 230 each have two packets P for which the transmission is requested, and "0110" input port 240 has one packet P for which the transmission is requested. Additionally, "0011" input port 220 does not have any packet P for which the transmission is requested.

As shown, the request route setting arbiters 311, 312, 313, 314 may be set next to the buffers 211, 221, 231, 241. The request route setting arbiters 311, 312, 313, 314 select one of the transmission requests from the corresponding input ports 210 to 240.

Referring to FIG. 4C, the process of setting transmission route between the input ports 210, 220, 230, 240 and the output ports 250, 260, 270, 280 will be described below.

As shown in (a) of FIG. 4C, "0000" input port 210 requests the "0000" output port 250 and the "0011" output port 260 for the transmission. The "0101" input port 230 requests the "0011" output port 260 and the "0110" output port 280 for the transmission. The "0110" input port 240 request the "0110" output port 280 for the transmission.

As explained above, some of transmission requests may overlap, and this can be settled by the request route setting arbiters 311, 312, 313, 314 by which the "0000" input port 210 requests the "0000" output port 250 for the transmission, the "0101" input port 230 requests the "0011" output port 260 for the transmission, and the "0110," input port 240 requests the "0110" output port 280 for the transmission.

Referring to (b) of FIG. 4C, by the grant route setting arbiter 210, the "0000" output port 250 grants the request by the "0000" input port 210, the "0011" output port 260 grants the request by the "0101" input port 230, and the "0110" output port 280 grants the request by the "0110" input port 240.

By the processes of (a) and (b) of FIG. 4C, "0000" is assigned to the "0000" input port 210 and the "0000" output port 250 respectively as spreading and dispreading codes. Additionally, "0011" is assigned to the "0101" input port 230 and the "0011" output port 260 respectively as spreading and dispreading codes. "0110" is assigned to the "0110" input port 240 and the "0110" output port 280 respectively as spreading and dispreading codes.

Referring to (c) of FIG. 4C, the "0000" input port 210 spreads the data using the assigned code "0000" and transmits the data to the "0000" output port 250. Additionally, the "0101" input port 230 spreads the data using the assigned code "0011" and transmits the data to the "0011" output port 260. The "0110" input port 240 spreads the data using the assigned code "0110" and transmits the data to the "0110" output port 280.

The "0000" output port 250, the "0011" output port 260 and the "0110" output port 280 despread the received data using respectively assigned dispreading codes of "0000", "0011" and "0110".

Figure 5:
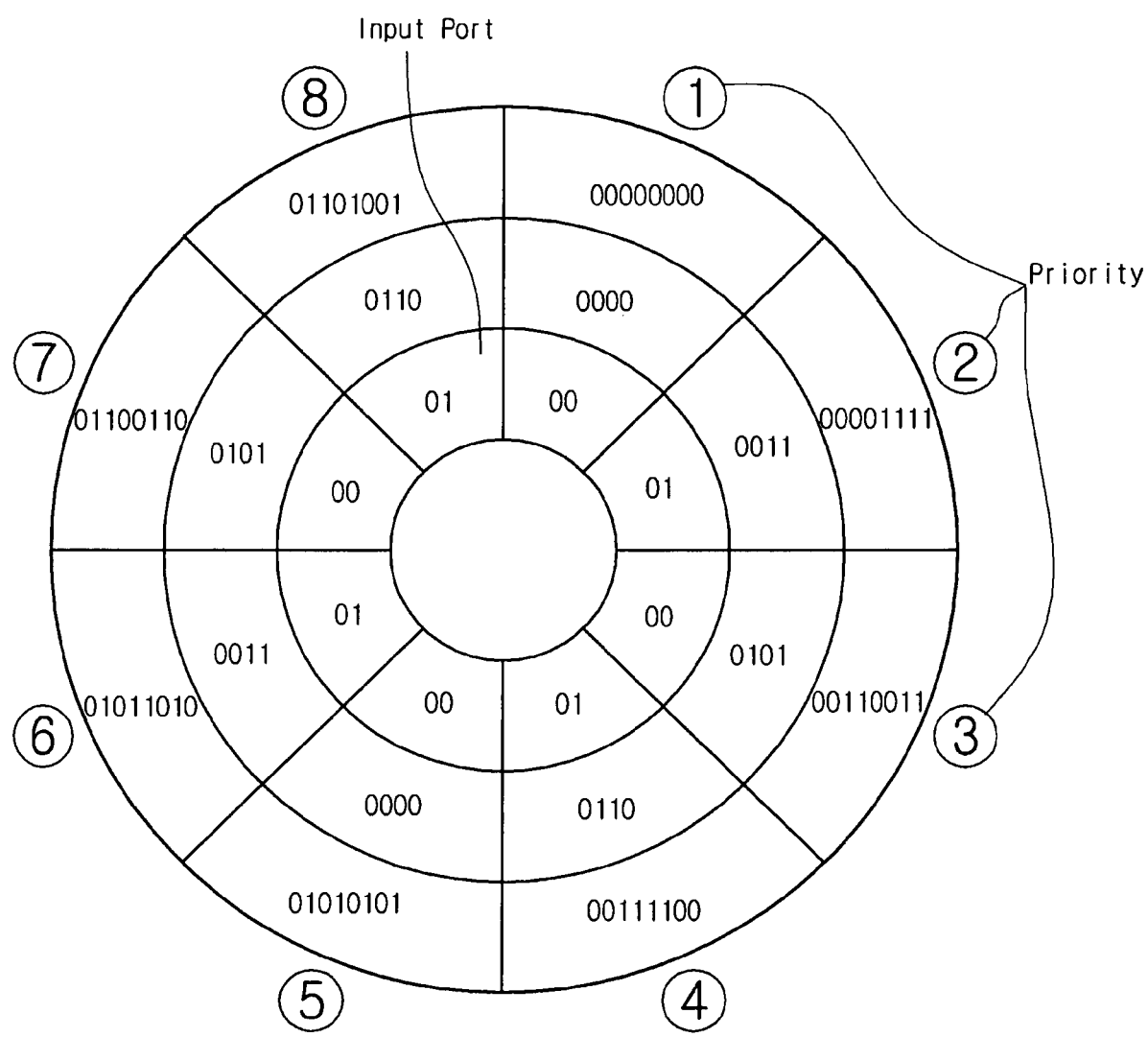
FIG. 5 shows a priority given to input ports by a scheduler to prevent contention.

FIG. 5 shows a priority given to the input ports by the scheduler to prevent contention.

With reference to FIG. 5, a method for preventing contention among input active ports if the scheduler 300 determines that contention occurs as a result of XOR calculation is now described.

In this embodiment, the scheduler 300 gives a priority to the active input ports in the concentric table. The priority is 1>2>3>4>5>6>7>8 as shown in FIG. 5.

When contentions are detected, pointers have to be moved to the place that contentions are avoided. When one contention is detected, lower priority pointer among conflicted two pointer moves toward the nearest available orthogonal codeword clockwise.

When two contentions are detected, same algorithm is still applied, but special attention should be made in this case. Among two contention pointers, one lower priority pointer moves toward the nearest lower priority orthogonal codeword among two candidates clockwise and simultaneously, the other higher priority pointer moves toward the nearest higher priority orthogonal codeword among two candidates clockwise.

Figure 6:
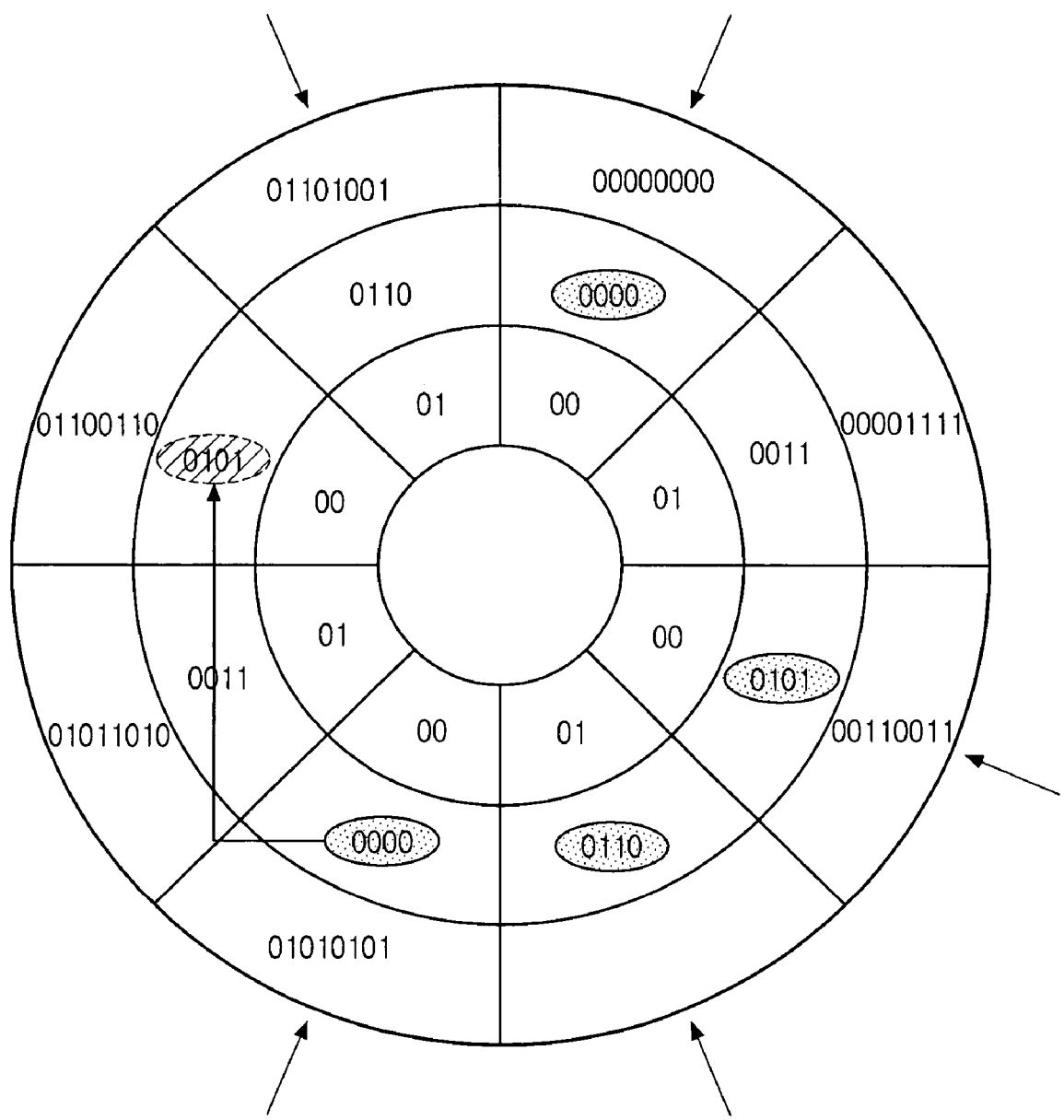
FIG. 6 shows one example of a collision preventing method of a scheduler.

FIG. 6 shows one example of a contention preventing method of the scheduler 300.

Referring to FIG. 6, active input ports are expressed by '0000', '0101', '0110', and '0000' (illustrated in the solid oblong circle). Herein, contention occurs in the input port '0000'. If the input port '0000' moves two spaces in the direction of arrow, the input port '0000' still contends with the input port '0101'. Therefore, the pointer of the input port '0000', which is distanced from the other three input ports, moves clockwise, and changes the input port '0000' into '0011'. Accordingly, the contention is prevented from occurring in the active input ports.

Figure 7:
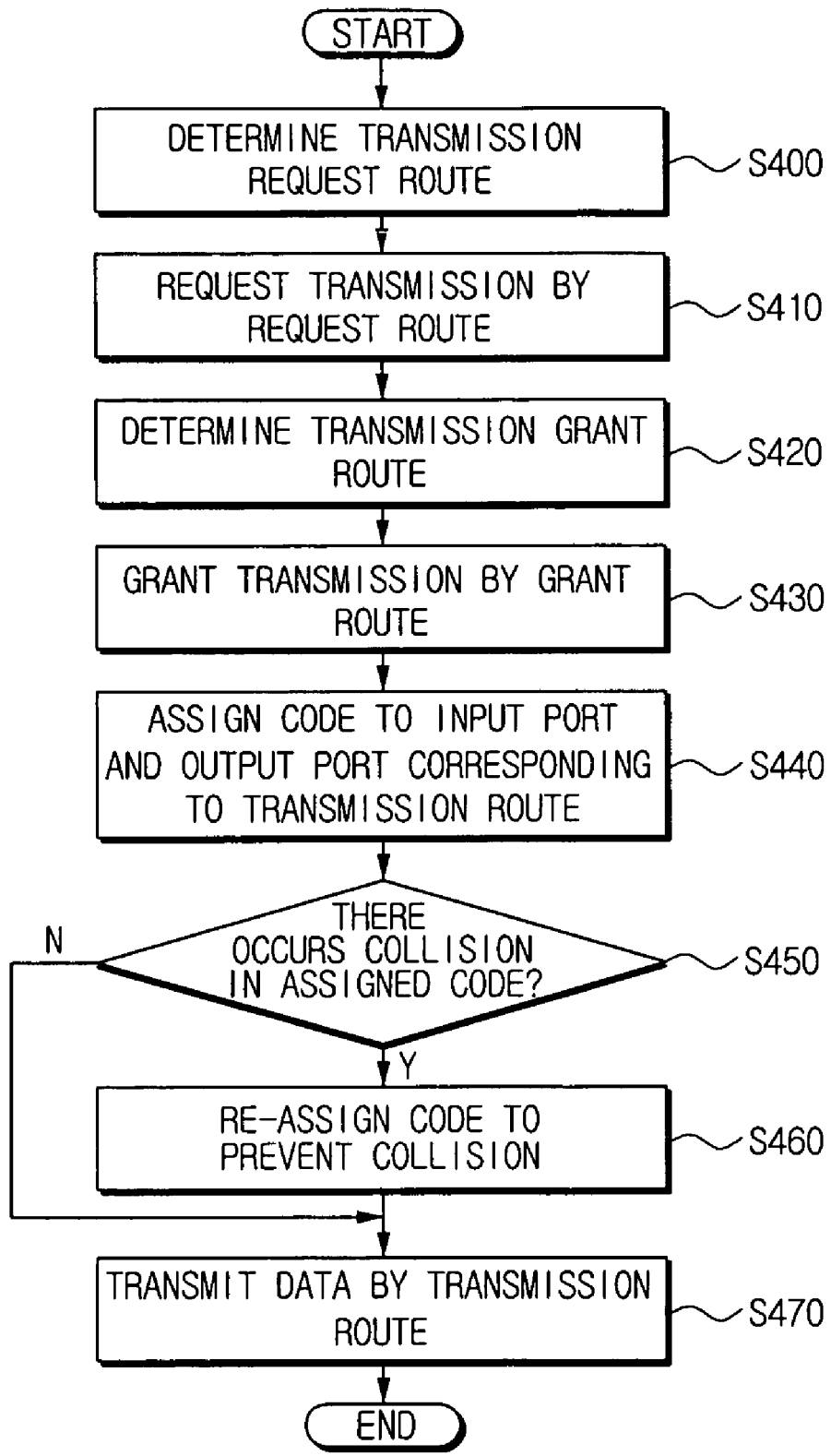
FIG. 7 is a flowchart provided for explaining a scheduling method of a switching device according to an embodiment of the present invention.

FIG. 7 is a flowchart provided to explain the scheduling method of a switching device according to an embodiment of the present invention. More specifically, the scheduling method of the switching device according to an embodiment of the present invention will be described below with reference to FIGS. 2 to 6.

The input port 200a determines a request route through which it will request the output port 200b for the transmission. One input port 200a may issue one or more transmission requests (S400).

When a request route for transmission is determined by the request route setting arbiter 10a, the input port 200a requests the output port 200b corresponding to the determined request route for the transmission (S410).

When requested for the transmission, the output port 200b determines a grant route through which the transmission is granted. Because one output port 200b may issue one or more transmission requests, the grant route is determined by the grant route setting arbiter 310b (S420).

When the grant route is determined by the grant route setting arbiter 310b, the output port 200b grants the input port 200a corresponding to the determined grant route the transmission (S430).

Accordingly, the input port 200a request transmission, the output port 200b grants the transmission, and therefore, the data transmission route is set. The scheduler 300 assigns a predetermined code to the input port 200a and the output port 200b corresponding to the determined transmission route. At this time, the length of the code being assigned to the input port 200a and the output port 200b may be determined by the scheduler 300 based on the number of input ports 200a which takes grant signals back (S440).

The scheduler 300 determines whether contention occurs in the assigned codes by applying an XOR calculation to active input ports (S450).

If it is determined that contention occurs among the active input ports as a result of XOR calculation, the scheduler 300 changes locations of the active input ports such that all the active input ports are located adjacent to one another in a concentric table (S460).

The input port 200a spreads the data with the assigned spreading code and transmits the data to the output port 200b, and the output port 200b receives the data from the input port 200a and despreads the data with the assigned dispreading code (S470)

Figure 8A:
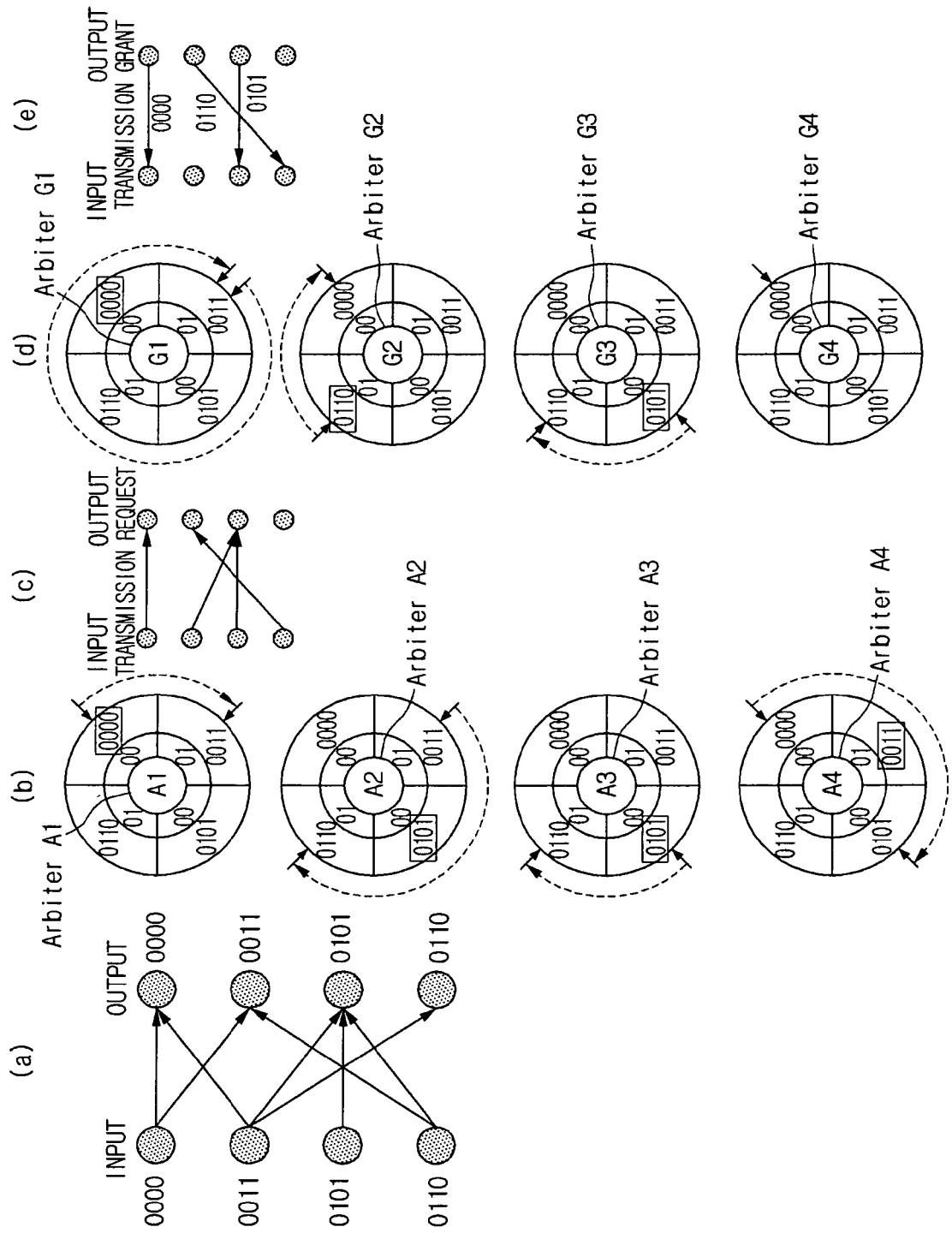
FIGS. 8A and 8B show one example of method of routing and code assignment of a switching device according to an embodiment of the present invention.
Figure 8B:
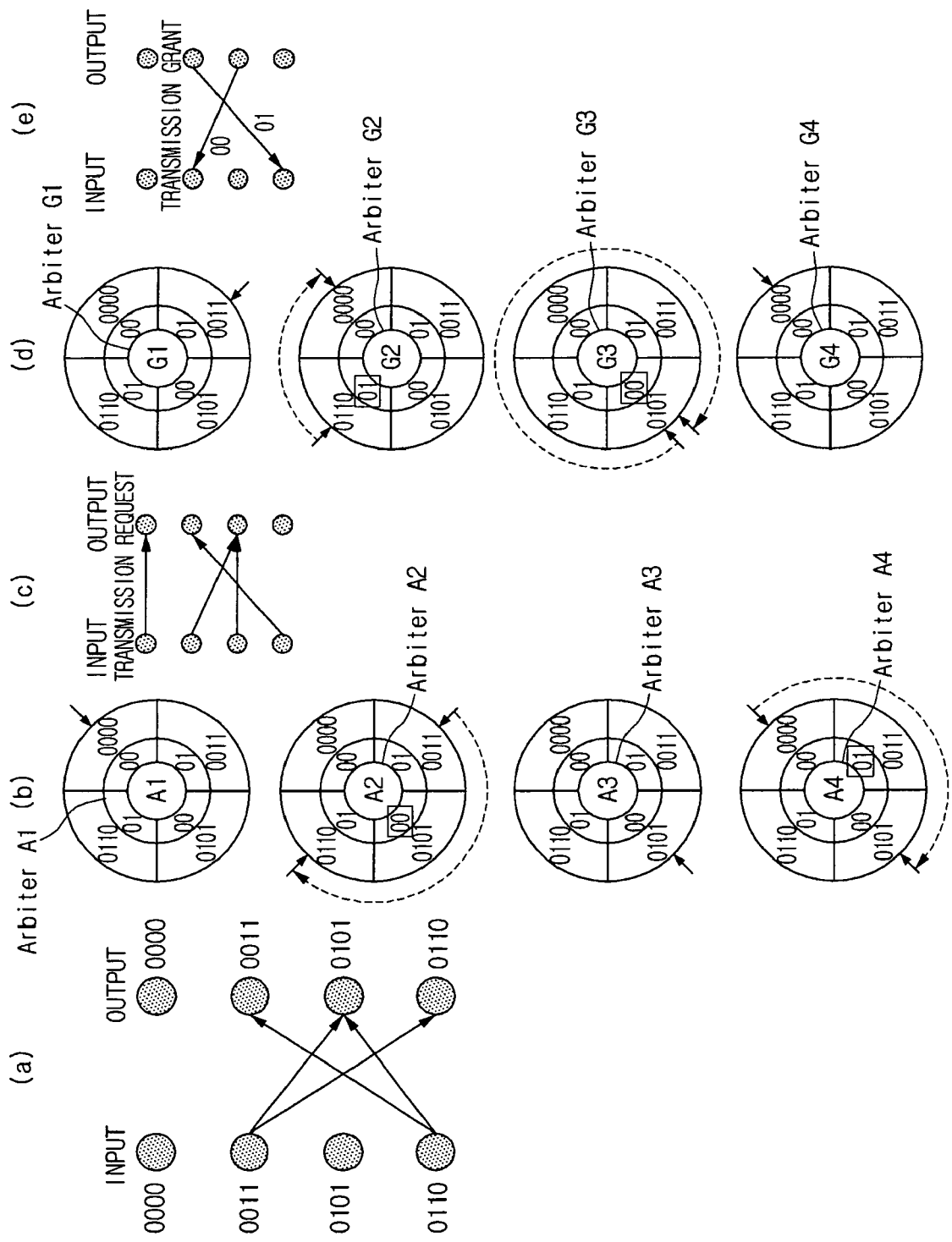

FIGS. 8A and 8B illustrates one example of a routing and code assigning process of a switching device according to an embodiment of the present invention.

Referring to FIG. 8A, the routing and code assigning method will be described below with reference to one example of a switching part 100 which has four input ports 200a and four output ports 200b and in which four input ports 200a posses the data.

Referring to (a) of FIG. 8A, the "0000" input port intends to request transmission to the "0000" output port and the "0011" output port, the "0011" input port intends to request transmission to the "0101" output port and the "0110" output port, the "0101" input port intends to request transmission to the "0101" output port, and the "0110" input port tends to request transmission to the "0011" output port and the "0101" output port, respectively.

When one input port 200a requests to the plurality of output ports 200b for the transmission, one output port 200b is selected by the request route setting arbiter 310a.

Referring to (b) of FIG. 8A, because the pointer is at "0000", the arbiter A1 determines that transmission request is sent to the "0000" output port. As for the arbiter A2, because the pointer is at "0011", the "0101" output port, which is the first one to meet after rotating in a predetermined direction, is determined to be the output port to send the transmission request. As for the arbiter A3, because the pointer is at "0101", the "0101" output port is determined to be the output port to send the transmission request. As for the arbiter A4, because the pointer is at "0000", the "0011" output port is determined to be the output port to send the transmission request.

According to an embodiment of the present invention, the arbiters A1 to A4 rotate from the current point in a predetermined direction (as indicated by the phantom arrows) and determine codes to request transmission, and then rotate the pointer by clock-wise one slot so that the determined code is not used at the next request for transmission. This is indicated by the phantom arrows of (b) of FIG. 8A.

The input port 200a request transmission to the output port 200b through the request route as determined by the arbiters A1 to A4. (c) of FIG. 8A illustrates that one or a plurality of transmission requests are transmitted to one output port 200b.

Referring to (d) of FIG. 8A, the arbiter G1 rotates the current pointer from "0011" to select "0000", and the arbiter G2 selects "0110" by the current pointer "0110". The arbiter G3 selects "0101" by the current pointer "0101" and the arbiter G4, although having current pointer "0000", does not operate because there is no request for transmission.

Referring to (e) of FIG. 8A, the output port 200b grants transmission to the input port 200a through the grant route which is determined by the arbiters G1 to G4.

"0000" is assigned to the "0000" input port and the "0000" output port as spreading and dispreading codes, and "0101" is assigned to the "0101" input port and the "0101" output port as the spreading and dispreading codes. "0110" is assigned to the "0110" input port and the "0011" output port as the spreading and dispreading codes.

Referring to FIG. 8B, the routing and code assigning method will be described below with reference to one example of a switching part 100 which has four input ports 200a and four output ports 200b and in which two input ports 200a posses the data.

Referring to (a) of FIG. 8B, the "0011" input port intends to request transmission to the "0101" output port and the "0110" output port, and the "0110" input port intends to request transmission to the "0011" output port and the "0101" output port. When there are two input ports 200a which posses the data, the scheduler 300 applies the code which is assigned to the first concentric circle from the center.

Referring to (b) of FIG. 8B, the arbiter A2 rotates from the current pointer "0011" in a predetermined direction and selects "00" which corresponds to "0101", and the arbiter A4 rotates from the current pointer "0000" in a predetermined direction and selects "01" which corresponds to "0011". The arbiters A1 and A3 do not operate.

Referring to (c) of FIG. 8B, the "0011" input port request transmission to the "0101" output port as determined by the arbiter A2, and the "0110" input port request transmission to the "0011" output port as determined by the arbiter A4.

Referring to (d) of FIG. 8B, the "0011" output port, which receives transmission request from the "0110" input port, selects "01" corresponding to "0110" by the arbiter G2. The "0101" output port, which receives transmission request from the "0101" input port, would have to select "01" corresponding to "0011" by the arbiter G3. However, due to overlap with the code determined by the arbiter G2, the scheduler 300 rotates the pointer of the arbiter G3 to the position of pointing "00" that avoids codes contention.

As described above in a few exemplary embodiments of the present invention, according to a switching device of NoC system and a scheduling method thereof, the number of active input ports having the data is determined by the scheduler, and OVSF codes, which are variable in length according to the number of active input ports as determined by the scheduler, are applied as spreading and dispreading codes. Therefore, internal computations and power consumptions of the switching part can be reduced at a maximum. Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A switching device of a NoC (Networks on chip) system, comprising:

a switching part comprising a plurality of input ports and a plurality of output ports; and a scheduler to set a transmission route between the input ports and the output ports, determining a length of code based on the number of input ports having data among the plurality of input ports, and assigning a predetermined code of a determined code length to an input port and an output port corresponding to the set transmission route, wherein the scheduler comprises a request route setting arbiter to determine a request route through which the input port requests the output port for transmission, and a grant route setting arbiter to determine a grant route through which the output port grants transmission to the input port, the request route setting arbiter and the grant route setting arbiter comprise a Round Robin arbiter which has a table of one or more concentric circles of different code lengths, and each of the concentric circles includes a plurality of cells which are assigned with a predetermined codeword, the request route setting arbiter determines a code of a first cell to meet after rotating a pointer in a predetermined direction, to be a spreading code, the scheduler determines the spreading code using the request route setting arbiter, and determines whether a contention occurs by applying an XOR calculation to the input ports having data, and if a value of '1' does not exist in a result of the XOR calculation, the scheduler determines that the contention occurs among the input ports having data.

2. The switching device of claim 1, wherein the number of the concentric circles is determined by:

$$N=2^n$$

where, N is the number of input ports provided to the switching part, and n is the number of the concentric circles.

3. The switching device of claim 1, wherein the table of the concentric circles is assigned with an orthogonal code which increases in length from a center toward an outer boundary of the circles.

4. The switching device of claim 1, wherein the request route setting arbiter and the grant route setting arbiter assign codes of (m)th concentric circle from the center according to the following mathematical expression, to the input port and the output port corresponding to the set transmission route:

$$\text{when } \frac{N}{2^3} \le T \le \frac{N}{2^2}, m = 1$$
$$\text{when } \frac{N}{2^2} < T \le \frac{N}{2}, m = 2$$
$$\text{when } \frac{N}{2} < T \le N, m = 3.$$

where, N is the number of the input ports provided to the switching part, and T is the number of the input ports possessing the data.

5. The switching device of claim 1, wherein, if it is determined that the contention occurs among the input ports having the data, the scheduler changes locations of the input ports having the data such that the input ports having the data are located adjacent to one another in the concentric table.

6. The switching device of claim 1, wherein the grant route setting arbiter determines a code of a first cell to meet after rotating the pointer in a predetermined direction, to be a despreading code.

7. The switching device of claim 1, the predetermined code comprises OVSF (Orthogonal Variable Spreading Factor) code.

8. The switching device of claim 1, wherein the switching device is a CDMA (Code Division Multiple Access) switching device.

9. A scheduling method of a switching device comprising an input port for receiving data and an output port for outputting the data transmitted from the input port, comprising:

setting a transmission route between the input port and the output port;

determining a length of code based on the number of input ports which have the data among a plurality of input ports;

assigning a predetermined code of the determined code length to the input port and the output port corresponding to the set transmission route;

spreading and dispreading the data by the assigned code; and determining occurrence of a contention by applying an XOR calculation to the in input ports having the same, wherein, at the operation of determining the occurrence of the contention, if a value of '1' does not exist in a result of the XOR calculation, it is determined that the contention occurs among the in input port having the data.

10. The scheduling method of claim 9, wherein the operation of setting the transmission route comprises:

determining a request route through which the input port requests transmission to the output port, and requesting the transmission according to the determined request route; and determining a grant route through which the output port grants transmission to the input port, and granting the transmission according to the determined grant route.

11. The scheduling method as claim 9, wherein, at the operation of determining the occurrence of the contention, if it is determined that the contention occurs among the input ports having the data, locations of the input port having the data are changed such that the input ports having the data are located adjacent to one another in a concentric table.

12. The scheduling method of claim 9, wherein the predetermined code comprises an OVSF (Orthogonal Variable Spreading Factor) code which is variable in length.

* * * * *

UNITED STATES PATENT AND TRADEMARK OFFICE
CERTIFICATE OF CORRECTION

PATENT NO. : 7,697,563 B2
APPLICATION NO. : 11/326327
DATED : April 13, 2010
INVENTOR(S) : Beom-hak Lee et al.

It is certified that error appears in the above-identified patent and that said Letters Patent is hereby corrected as shown below:

Column 12, Line 27 Claim 9, after "calculation to the" delete "in".

Column 12, Line 31 Claim 9, after "among the" delete "in".

Column 12, Line 41 Claim 11, after "method" change "as" to --of--.

Signed and Sealed this

Thirteenth Day of July, 2010

David J. Kappos
*Director of the United States Patent and Trademark Office*